Sept. 3, 1940.  M. H. TUFT  2,213,891
TRAILER BRAKE MECHANISM
Filed March 27, 1939  2 Sheets-Sheet 1

INVENTOR:
MILES H. TUFT
BY
ATTORNEYS.

Sept. 3, 1940.  M. H. TUFT  2,213,891
TRAILER BRAKE MECHANISM
Filed March 27, 1939  2 Sheets-Sheet 2
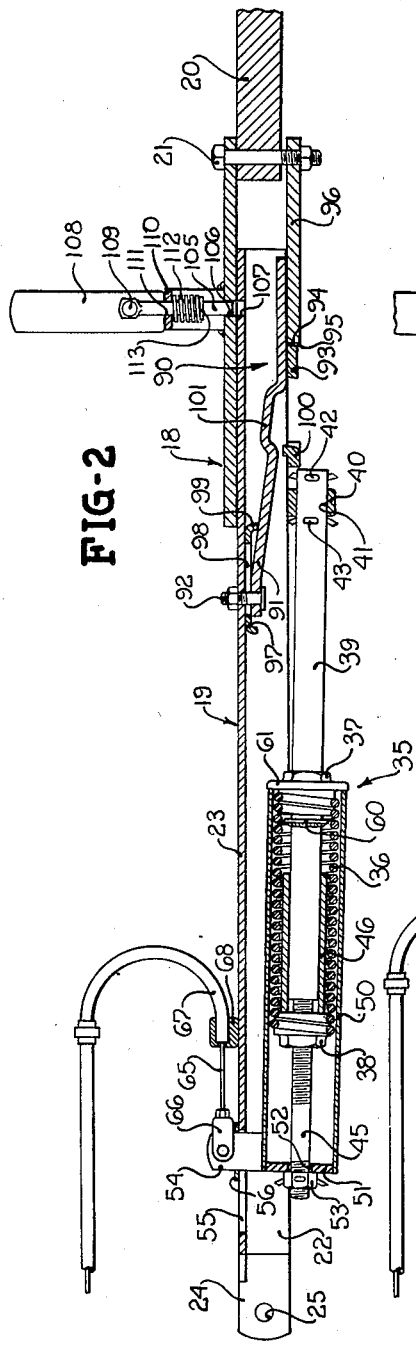
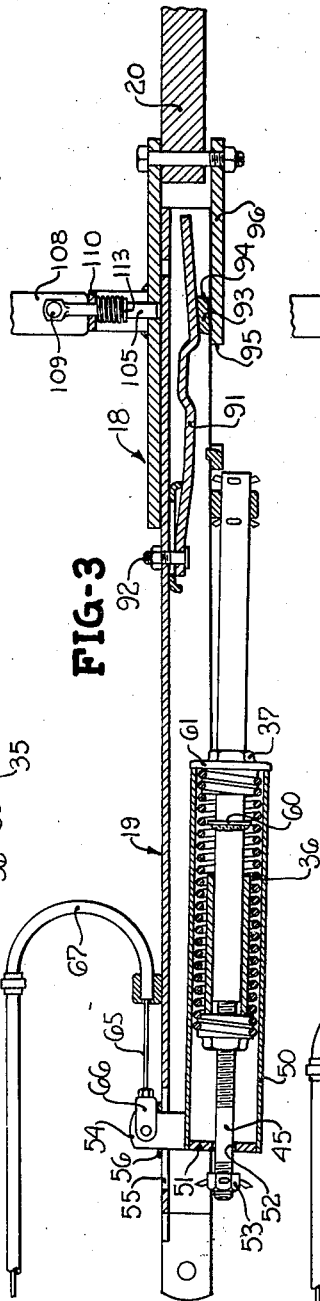
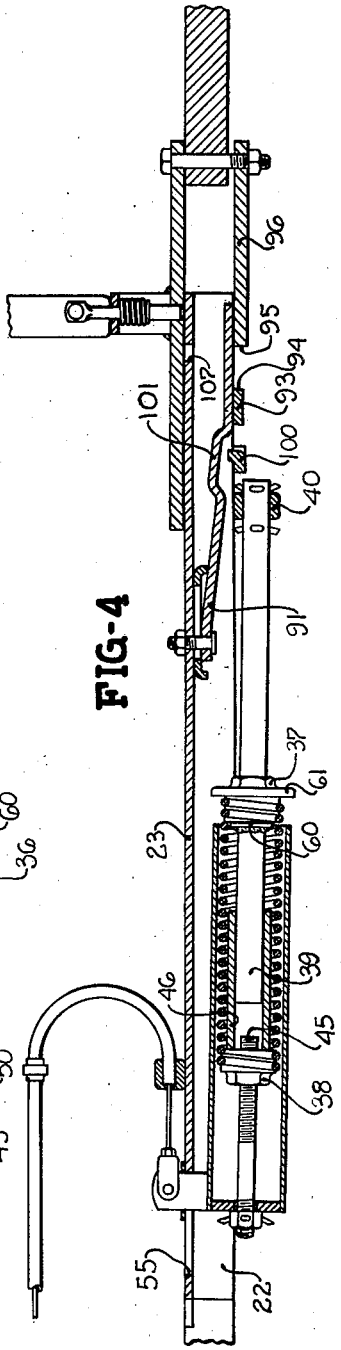
INVENTOR:
MILES H. TUFT
BY
ATTORNEYS.

Patented Sept. 3, 1940

2,213,891

UNITED STATES PATENT OFFICE 2,213,891

TRAILER BRAKE MECHANISM

Miles H. Tuft, Moline, Ill., assignor to Deere & Company, Moline, Ill., a corporation of Illinois Application March 27, 1939, Serial No. 264,345

24 Claims. (Cl. 188—142)

The present invention relates generally to trailer hitch devices and more particularly to hitch devices of the telescoping type having control means for operating the brakes on the trailer by the force of inertia when the trailer overruns the tractor, as when the latter is braked. It has as its principal object, the provision of a novel, improved, overrunning brake control mechanism that is simpler and more durable than those of the prior art.

Another object relates to the provision of novel locking means which prevents the application of the trailer brakes during normal travel of the vehicles and thus eliminating unnecessary and undesirable brake applications when the tractor slows down slightly or when the trailer tends to gently push forward against the tractor on a down grade, but which locking means are instantaneously and automatically released when the brakes on the tractor are deliberately applied. This locking means also serves to prevent the trailer brakes from being actuated as the tractor is reversed to push the trailer backwards.

A more specific object of this invention is the provision of novel locking means for normally restraining the hitch device from being telescoped together to apply the trailer brakes, but which locking means are yieldable to a certain amount of force such as would be imposed on the hitch device when the tractor brakes are suddenly applied. Another related object relates to the provision of means for adjusting the amount of force necessary to overcome the influence of the locking means.

A further object of this invention, having to do with the simplification of overrunning braking control mechanism, relates to the provision of a single spring through which the draft force is transmitted either forwardly or rearwardly between the tractor and trailer. More specifically, it is another object of this invention to provide a single spring means through which the forward pulling force of the tractor is transmitted to tow the trailer, with the further provision for transmitting a rearward force, when the tractor brakes are applied, through the same spring to the brake actuating mechanism on the trailer.

A still further object of this invention, in line with the further simplification of hitch devices of this kind, is the provision of simplified means for transmitting a relatively rearwardly acting movement of the tractor-connected draft member to exert a forward pull on the trailer brake actuating mechanism. This object is accomplished by means of a flexible cable in a flexible conduit, which is extended forwardly from the trailer, the forward end being trained through an angle of 180 degrees and mounted on the draft member, thus obviating the necessity for reversing levers, etc., as well as providing for vertical and lateral swinging movement of the hitch relative to the trailer body.

These and other objects and advantages will be made apparent by a consideration of the following description of a preferred embodiment of this invention, in which reference is made to the drawings appended hereto, in which Figure 1 is a plan view of the forward portion of a trailer showing a hitch device embodying the principles of the present invention;

Figure 2 is an elevational view of the hitch device taken in section along the line 2—2 of Figure 1, and showing the device in the position assumed by the parts when the tractor is slowing down or backing up, the draft members being held against telescoping together by the locking means;

Figure 3 is a view similar to Figure 2, but in which the parts are in the positions assumed after the locking means has yielded and the trailer brakes are being applied; and Figure 4 is a view similar to Figures 2 and 3 but in which the hitch device is extended, as when the tractor is exerting a towing force upon the device.

Figure 1:
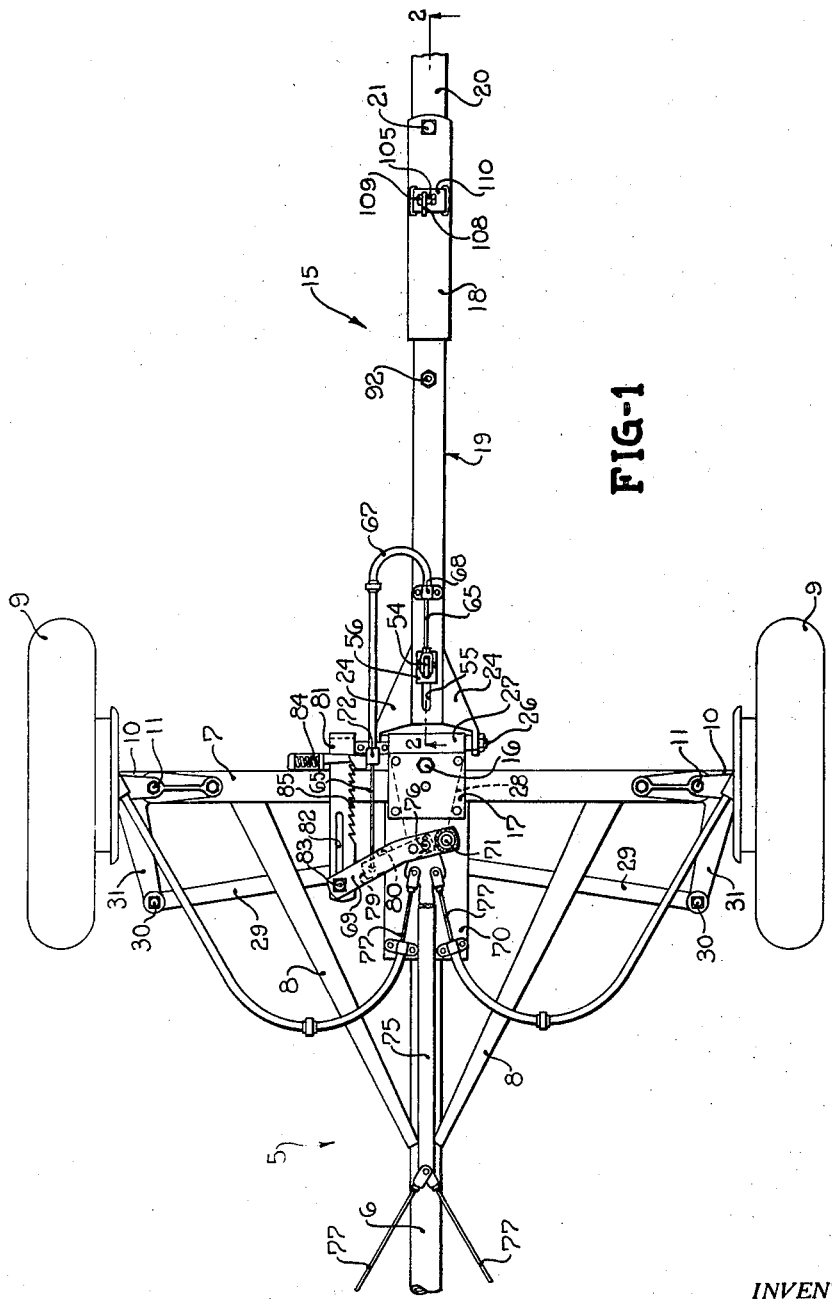

Referring now to the drawings, reference numeral 5 indicates in its entirety, a trailer comprising a fore and aft extending reach pole 6, the forward end alone of which is shown, a transversely extending axle 7 fixed to the forward end of the reach pole 6 and rigidly secured by diagonal braces 8, and a pair of dirigible front wheels 9 mounted on steering knuckles 10, which are journaled at opposite ends of the axle 7 on vertical bolts 11. A hitch member, indicated generally by reference numeral 15, extends forwardly from the tractor axle 7 and is pivotally supported thereon for lateral swinging movement about a pivot bolt 16, which is carried in a plate 17 fixed to the axle 7 by any suitable means. The hitch device 15 further includes a pair of telescoping draft members 18, 19, the forward member 18 of which is of tubular construction, within which the rear draft member 19 is slidable in a fore and aft direction. The forward member 18 is connected for lateral swinging movement to the drawbar 20 of a tractor or towing vehicle by means of a vertical pivot bolt 21. The rear draft member 19 is in the form of a channel member having downwardly extending flanges 22 and a horizontal web portion 23, which serves to protect the brake control mechanism to be described later. At the rear end of the draft member 19 are secured a pair of laterally outwardly extending brackets 24, in which are a pair of aligned apertures 25 adapted to receive a transverse pivot bolt 26, about which the draft member 19 is vertically swingable. The latter is carried on a supporting member 27, which is supported for lateral swinging movement on the vertical pivot bolt 16, and which has a portion 28 extending rearwardly under the axle 7 and pivoted by suitable means (not shown) to a pair of drag links 29, which extend outwardly to pivot connections 30 with rearwardly extending steering arms 31 on the knuckles 10. It is thus evident that the trailer 5 can be guided by swinging the hitch device 15 to the left or right about the bolts 16, thereby acting through the links 29 to swing the wheels 9 about the bolts 11 in a manner well known to those skilled in the art.

The telescoping draft members 18, 19 are interconnected by spring means, indicated generally by the reference numeral 35, for transmitting a towing force from the tractor drawbar 20 to the trailer 5. The interconnecting spring means 35 comprises a helical tension spring 36 disposed beneath the web 23 of the channel member 19 and having terminal bushings 37, 38 at the forward and rear ends thereof, respectively, to which the ends of the spring are suitably fastened in the usual manner. The forward terminal bushing 37 is slidable upon a fore and aft extending rod 39, which lies co-axially within the helical spring 36 and extends forwardly to a securing lug 40 fixed to the lower side of the tractor connected draft member 18. The lug 40 has an aperture provided to receive the rod 39 and permitting fore and aft sliding movement therebetween. A pair of cotter pins 42, 43 are inserted through suitable holes drilled in the rod 39 at spaced points to serve as limit stops for the rod 39 as it slides through the aperture 41. The cotter pins are spaced to permit a limited amount of lost motion, for purposes which will be explained later.

The rear terminal bushing 38 has a threaded aperture therethrough, which engages a threaded bolt 45, the latter extending through the bushing and normally abutting the rear end of the slidable rod 39 when the spring 36 is relaxed. The bushing 38 has a forwardly extending tubular portion 46 fixed thereto, which provides a socket within which the rear end of the rod 39 is slidable forwardly from its position abutting the end of the bolt or rod 45, as in Figure 4. The latter can be adjusted fore and aft by screwing it into or out of the threads in the bushing 38. The spring 36 is disposed inside of a housing member 50, the rear end of which is provided with a closure 51 having an aperture 52 adapted to slidably receive the bolt 45, which extends through the aperture 52 and has a stop nut 53 threaded on the outer end thereof. The housing 50 is hung on the trailer-connected draft member 19 by means of a vertically disposed lug 54, welded or otherwise fixed to the housing 50, and extending upwardly through a slot 55 in the web 23 of the draft member 19. A plate 56, which is slidable on the top surface of the web 23, is welded or otherwise fixed to the lug 54 to support the latter, thus carrying the housing 50 on the draft member 19 in fore and aft sliding relation, the extent of the sliding movement being limited by the lug 54 striking the front or rear ends of the slot 55.

It is now apparent that a forward pull on the draft member 18 is transmitted through the lug 40 and the cotter pin 42 to the rod 39. An annular projection 60, welded to the rod 39 behind the spring terminal bushing 37, serves as a stop which engages the bushing 37 upon forward movement of the rod 39 and causes the spring 36 to stretch. The reaction of the spring is held by the bolt 45 which is in threaded engagement with the bushing 38 and by the nut 53 on the outer end of the bolt 45, which engages the closure 51. The reaction of the spring causes the lug 54 to engage the forward end of the slot 55, thus completing the connection between the tractor-connected draft member 18 and the trailer-connected draft member 19. As the spring stretches (see Figure 4) due to a pull on the tractor drawbar 20, the rear end of the rod 39 moves away from contact with the bolt 45 as it slides through the tubular portion 46 of the bushing 48. The spring 36 cushions the draft force applied to the trailer, thus preventing any sudden jerks from being transmitted directly to the trailer.

When the tractor is braked during forward operation, the inertia of the trailer sets up a compression force against the draft member 19, tending to telescope the two draft members 18, 19 together. In this case, the reaction of the tractor acts in a rearward direction upon the lug 40, against the cotter pin 43 and the rod 39 (as shown in Figure 3). The rear end of the rod 39 is pushed into contact with the end of the bolt 45, sliding the latter through the aperture 52 in the closure 51 and stretching the tension spring 36 rearwardly. The reaction of the forward end of the spring 36 is resisted by a radially outwardly extending flange 61 on the bushing 37, which engages the forward end of the housing 50, tending to push the housing rearwardly relative to the draft member 19, thereby moving the lug 54 rearwardly in the slot 55.

This rearward movement of the lug 54 and slot 55 is utilized to apply the brakes on the trailer by means of a flexible cable 65 which is connected to the lug 54 by a clevis 66 and extends forwardly from the lug 54. The flexible cable is sheathed in a flexible conduit 67 which is rigidly clamped in a fitting 68 fixed, as by welding, to the top side of the web 23. The cable 65 and its enclosing sheath 67 is trained through an angle of 180 degrees and extends rearwardly to a brake actuating lever 69 to which the rear end of the cable 65 is connected by lost motion means as will be described later. This lever 69 is pivoted by means of a pivot bolt 71, to a plate 70, fixedly secured to the frame of the trailer. The rear end of the flexible conduit 67 is clamped in a fitting 72 which is suitably fixed to the axle 7. Hence it is clear that a compression force acting rearwardly against the tractor connected draft member 18 results in a rearward movement of the lug 54 to which the flexible cable 65 is connected, and by virtue of the 180 degree bend in the cable, a forward pull is transmitted to the brake actuating lever 69. Thus the flexible cable serves not only to provide a flexible connection between the swinging draft member and the trailer brake mechanism, but also serves as a reversing means to reverse the direction of the application of force to the brake lever 69.

A rearwardly extending brake rod 75 is pivotally connected by means of a pin 76 to the brake lever 69 and to this brake rod are connected flexible brake actuating cables 77 extending to each of the front and rear brakes, respectively.

The cable 65 is connected to the brake actuating lever 69 by a lost motion connection consisting of an auxiliary lever 79 pivotally connected to the brake lever 69 on the pivot pin 76. The cable 65 being connected to the auxiliary lever 79, pulls the latter forwardly against a stop 80, welded on the underside of the lever 69, and through this engagement the lever 69 is swung by actuation of the cable. The lever 69 can be set manually by means of a manually operated control bar 81, having a longitudinally extending slot 82 therein. The outer end of the brake lever 69 is connected to the hand control bar 81 by a bolt 83 which passes through the slot 82. When the brake lever 69 is actuated by the mechanical control cable 65, the bolt 83 slides through the slot 82 without moving the manual control bar 81. On the other hand, the brake lever 69 can be actuated manually by means of the lever 81 without affecting the cable 65, the auxiliary lever 79 being merely swung about the pin 76 away from the stop 80. The manual control 81 is secured in adjusted position by a suitable ratchet mechanism 84 engageable with teeth 85 cut in the side of the bar 81.

In the event that the automatic braking control is not desired, the plate 56 can be welded or otherwise rigidly fixed to the draft member 19, in which case the spring 46 acts merely as a cushion spring between the two vehicles for cushioning shocks transmitted in either direction through the hitch device.

In order to prevent the trailer brakes from being applied automatically every time the tractor slows down gradually and on downgrades when the trailer tends to overrun the tractor, as well as when the tractor is reversed to back the trailer, locking means 90 is provided between the two telescoping draft members 18, 19. The locking means 90 comprises a spring bar 91 rigidly attached to the underside of the web 23 on the trailer connected draft member 19 by means of a bolt 92, and extending forwardly and downwardly to a sliding engagement with the upper side of the bottom plate 96 of the draft member 18. To the underside of the bar 91, is welded or otherwise rigidly fixed, a detent block 93 having a forwardly facing camming surface 94 disposed in abutment with the rear edge 95 of the bottom plate 96. The camming surface 94 is inclined slightly, whereby it frictionally engages the edge 95 normally to prevent telescoping the two members 18, 19 together, but is forced upwardly against the pressure of the spring bar 91 by application of a certain amount of force acting in compression against the draft members 18, 19. The amount of force required to disengage the detent block 93 can be regulated by adjusting the amount of spring pressure tending to force the spring bar 91 down against the lower plate 96. This adjustment is accomplished by means of a slotted plate 97 interposed between the spring bar 91 and the web 23 with the bolt 92 extending through the slot 98. The forward end of the plate 97 has a flange 99 engaging the top of the bar 91 and serving as a fulcrum against which the bar 91 is forced down against the plate 96 when the bolt 92 is tightened. The spring pressure exerted by the bar 91 can be increased by loosening the bolt 92 and moving the plate 97 rearwardly to bring the fulcrum flange 99 closer to the bolt 92. Then when the latter is drawn up tight, the forward end of the spring bar 91 is caused to press with greater force downwardly against the plate 96.

In operation, when the draft members are extended during the towing operation, detent block 93 is spaced appreciably rearwardly of the edge 95 (see Figure 4), but as the trailer gradually overruns the tractor, the edges of the block 93 and plate 96 move into abutment with each other and prevent further overrunning of the trailer. However, when the brakes on the tractor are suddenly applied, the block 93 strikes the edge 95 with sufficient force to cause the camming edge 94 to rise over the plate 96, whereupon the block 93 is free to slide along the upper surface of the plate 96 and thereby releasing the telescoping draft member so that any force acting rearwardly against the tractor draft member 18 is transmitted through the spring 36 to the brake actuating cable 65, as shown in Figure 3. The limit of telescoping movement of the draft members 18, 19 is determined by the upper rear edge of the draft member 18 coming in contact with the bolt 92, preventing further telescoping movement together. The limit to which the draft members can be extended is determined by the rear edge of the detent block 93 striking a lower transverse bracing member 100, interconnecting the two downwardly extending outer flanges of the draft member 18. The spring bar 91 is provided with an offset portion 101 providing clearance between the spring bar 91 and the transverse brace 100.

The purpose of the lost motion between the lug 40 and the cotter pins 42, 43, is to provide a certain amount of impact force between the camming surface 94 and the rear edge 95 of the plate 96 when the vehicles move together, thereby facilitating a disengagement of the detent block when the brakes are suddenly applied on the towing vehicle.

In case of emergency, the braking mechanism can be locked out entirely by means of a pin 105, which can be inserted through apertures 106, 107 in the draft members 18, 19, respectively. These apertures are in alignment when the draft members are in the position shown in Figure 2. The pin is normally held in a retracted position by a toggle lever 108 to which the pin is pivoted by a bolt 109, but can be inserted by turning the lever 108 down in either direction. The toggle lever 108 is supported on a bracket 110 welded to the top of the draft member 18 and having an aperture 111 through which the pin extends. A spring 112 acts in compression to hold the toggle lever 108 down against the bracket 110, and the reaction of the spring is taken by a stop 113 fixed to the pin 105.

I do not intend my invention to be limited to the details of the embodiment shown and described herein, except as set forth in the following claims.

I claim:

1. A trailer hitch device comprising a pair of cooperative draft members movable longitudinally relative to each other, control mechanism connected between said members and actuated by relative movement between the latter, and means for yieldably locking said members against said relative movement comprising frictionally engaging surfaces and means biasing said surfaces into engagement but adapted to yield upon a sudden application of force to said draft members, thereby permitting relative movement therebetween.

2. A trailer hitch device comprising a pair of telescoping draft members, control mechanism connected between said members and actuated by relative longitudinal movement between the latter, and locking means for yieldably holding said members against said movement including parts normally disposed in abutment but movable out of engagement by application of force longitudinally of said draft members, and spring means yieldably holding said parts in abutment.

3. A device as set forth in claim 2 including means for adjusting the pressure of said spring means against said locking means.

4. A trailer hitch device comprising a pair of telescoping draft members adapted to be connected to towing and trailing vehicles, respectively, brake control mechanism connected between said draft members and adapted to apply brakes on said trailing vehicle responsive to a compression force on said draft members acting longitudinally thereon, and locking means for yieldably holding said control mechanism in the position in which the brakes are released, said locking means comprising a detent block attached to one of said members and having a camming surface adapted to normally engage the other of said members but movable out of engagement therewith by a sudden application of compression force upon said draft members, and means yieldably resisting said movement of said detent block out of engaged position.

5. A device as set forth in claim 4 in which the last named means is adjustable to regulate the amount of force required to disengage said detent block.

6. A trailer hitch device comprising a pair of cooperative draft members adapted to be connected to towing and trailing vehicles, respectively, means interconnecting said draft members including brake control means actuated by relative longitudinal movement of said members, a spring bar fixed to one of said draft members, a detent block on said bar having a camming surface disposed normally in engagement with the other of said draft members, said bar being adapted to yield to a certain force acting through said camming surface, whereby said detent block is disengaged from said other draft member and said draft members are free to slide longitudinally relative to each other to actuate said brake control means.

7. A device as set forth in claim 6, including means for adjusting the spring pressure exerted by said bar to hold said detent block in engagement.

8. A trailer hitch device comprising a pair of telescoping draft members adapted to be connected to towing and trailing vehicles, respectively, a spring having one end connected to one of said draft members and lost motion means connecting the other end of said spring to the other of said members, means for connecting brake actuating mechanism to said lost motion connecting means whereby brakes on said trailing vehicle are actuated through said spring when a force in one direction is applied to said draft members, but a force applied to said draft members in the opposite direction acts through said spring to propel the trailer, and detent means for restraining relative movement of said draft members in the direction for actuating the brake actuating mechanism, said detent means being yieldable to a certain amount of force in the last named direction.

9. In a hitch device for a trailer including a draft member movable fore and aft relative to the trailer, a resilient member, means connecting said resilient member between said draft member and said trailer for transmitting draft force therebetween, comprising reversible connecting means for connecting one end of said resilient member to said draft member and the opposite end of said resilient member to the trailer when the latter is pulled forwardly, said reversible means being adapted to connect said opposite end of the resilient member to said draft member and said one end of the resilient member to said trailer responsive to an overrunning of the latter relative to said draft member, and means for normally preventing said relative movement of said draft member and said trailer in at least one direction, said last named means being yieldable to a certain amount of force applied to said draft member in the direction in which said movement is being restrained.

10. A device as set forth in claim 9, including means for adjusting the amount of force required to cause said movement preventing means to yield.

11. In a hitch device for coupling a towing vehicle to a trailing vehicle having brakes and a brake actuating member, the combination of a fore and aft extending helical spring, lost motion connecting means at the forward end of said spring engageable to couple the latter to said towing vehicle to stretch the spring for transmitting a pulling force upon the trailing vehicle, and to said brake actuating member when the trailing vehicle overruns the towing vehicle, and lost motion connecting means at the rear end of said spring engageable to couple the latter to said trailing vehicle when the towing vehicle exerts a pulling force thereon, and to the towing vehicle to stretch the spring to apply draft force therethrough to said brake actuating member when the trailing vehicle overruns the towing vehicle.

12. A hitch device, comprising in combination, a draft member adapted for connection with a tractor, a draft member adapted for connection with a trailer, said members being relatively movable along the line of draft, a fore and aft extending helical spring, lost motion connecting means at the forward end of said spring engageable to couple the latter to said tractor draft member when the latter is moved forwardly relative to said trailer draft member, a trailer brake actuating member, lost motion connecting means engageable to couple said forward end of said spring to said brake actuating member when said tractor draft member is moved rearwardly relative to said trailer draft member, and lost motion connecting means engageable to couple the rear end of said spring selectively to said trailer draft member or to said tractor draft member, responsive to movements of said tractor draft member forwardly or rearwardly relative to said trailer draft member, respectively, to transmit draft force in either direction by stressing the spring in tension.

13. A hitch device as set forth in claim 12, including detent means for locking said draft members, restraining movement of said tractor draft member rearwardly relative to said trailer draft member, said detent means being releasable responsive to a certain amount of force acting rearwardly against said tractor draft member.

14. A hitch device comprising a pair of telescoping draft members, a helical spring, a rod extending axially from one end of said spring and connected to one of said draft members, a stop on said rod engageable with one end of said spring when said telescoping draft members are extended, said rod being adapted to slide into said spring and engage the opposite end of the latter when said draft members are telescoped together, a second rod connected to the other end of said spring and extending axially thereof, a rigid member connected with the other of said draft members and having a part engageable with said second rod when said draft members are extended, said rigid member being engageable with said one end of said spring when said draft members are telescoped together.

15. A hitch device comprising a pair of telescoping draft members, a helical spring, a rod extending axially from one end of said spring and connected to one of said draft members, a terminal bushing slidable on said rod and fixed to said one end of said spring, a stop on said rod engageable with said bushing upon movement of said rod outward from said spring, a tubular housing for said spring, a second terminal bushing fixed to the other end of said spring, a bolt secured to said second terminal bushing and slidable relative to said housing, a stop on said bolt adapted to engage said housing to resist said movement of said rod outwardly when said stop on the rod engages said bushing, said last mentioned bushing being engageable with said housing and said rod being engageable with said bolt when said rod is moved in the opposite direction, a lost motion connection between said housing and the other of said draft members, and a brake actuating member connected to said housing for actuation when the latter moves in one direction relative to said last mentioned draft member.

16. A trailer hitch device comprising in combination, a pair of telescoping draft members adapted for connection to a tractor and a trailer, respectively, and slidable relative to each other along the line of draft, a coil spring for transmitting draft between said members, a longitudinally sliding member connected to said trailer connected draft member for limited movement relative thereto along the line of draft and having lost motion connections with said spring adapted to engage one end of the latter when said sliding member is moved in one direction and the other end of said spring when said sliding member is moved in the opposite direction, a second longitudinally sliding member connected to said tractor connected draft member and having lost motion connections with said spring adapted to engage opposite ends of the latter when said second sliding member is moved in opposite directions, respectively, along the line of draft, and a trailer brake actuating member connected to said sliding member which is connected to the trailer connected draft member, whereby a pulling force on said tractor draft member is transmitted through the spring to said trailer draft member, while a force in the opposite direction is transmitted through said spring to said brake actuating member.

17. A trailer hitch device comprising in combination, a pair of telescoping draft members adapted for connection to a tractor and a trailer, respectively, and slidable relative to each other along the line of draft, a coil spring for transmitting draft between said members, a longitudinally sliding member connected to said trailer connected draft member for limited movement relative thereto along the line of draft and having lost motion connections with said spring adapted to engage one end of the latter when said sliding member is moved in one direction and the other end of said spring when said sliding member is moved in the opposite direction, a second longitudinally sliding member connected to said tractor connected draft member for limited movement relative thereto along the line of draft and having lost motion connections with said spring adapted to engage opposite ends of the latter when said second sliding member is moved in opposite directions, respectively, along the line of draft, a spring-backed detent for locking said draft members against telescoping movement together but releasable upon application of a certain amount of force acting in compression against said draft members, and a trailer brake actuating member connected to that sliding member which is connected to the trailer connected draft member, whereby said compression force is applied to actuate said brake member after said detent lock has been released.

18. In a trailer hitch device comprising a pair of telescoping draft members, one of said members being adapted for connection to a tractor and the other having a pivotal connection with a trailer, means interconnecting said draft members providing a limited movement relative to each other along the line of draft, and trailer brake actuating means comprising a flexible incompressible tubular member having its rear end fixed to the trailer and a flexible cable slidable within said tubular member and adapted for connection with brake mechanism on the trailer, the forward end portion of said cable and tubular member being trained through an angle of substantially 180 degrees and having means fixing the end of said tubular member on said trailer connected draft member, and means connecting said forward end of said flexible cable to said interconnecting means, whereby a rearward movement of said tractor connected draft member relative to said trailer connected draft member causes a forward pull on the rear end of said flexible brake actuating cable.

19. In combination with a trailer having brake mechanism, a pair of tractor and trailer draft members connected together by means providing a limited amount of relative longitudinal movement therebetween, and trailer brake actuating means comprising a flexible incompressible tubular member fixed at opposite ends thereof to said trailer and said trailer draft member, respectively, said tubular member being curved so that both ends thereof face in the same general direction, a flexible cable slidably disposed in said tubular member and extending from opposite ends thereof, one end of said cable being connected to said brake mechanism and the other end with said tractor draft member, whereby movements of the latter relative to said trailer draft member are transmitted through said cable to said brake mechanism but in relatively reverse direction.

20. In combination with a trailer having brake mechanism, a pair of tractor and trailer draft members connected together by means providing a limited amount of relative longitudinal movement therebetween, and trailer brake. actuating means comprising a flexible incompressible tubular member fixed at opposite ends thereof to said trailer and said trailer draft member, respectively, said tubular member being curved so that both ends thereof face generally rearwardly, a flexible cable slidably disposed in said tubular member and extending rearwardly from opposite ends thereof, one end of said cable being connected to said brake mechanism and the other end with said tractor draft member, whereby a rearward movement of the latter relative to said trailer draft member causes a forward pull by said flexible cable on said brake mechanism.

21. In combination with a trailer having brake mechanism and a draft member swingably connected to the trailer, means mounted on said draft member and movable longitudinally thereof for actuating said brake mechanism, a flexible, incompressible tubular member fixed at opposite ends thereof to said trailer and said draft member, respectively, said tubular member being curved through an angle of substantially 180 degrees so that both ends thereof face in the same general direction, a flexible cable slidably disposed in said tubular member and extending from opposite ends thereof to connections with said brake mechanism and said brake mechanism actuating means, respectively, for transmitting movements of the latter to said brake mechanism but in relatively reverse direction.

22. A hitch device, comprising in combination, a draft member adapted for connection with a tractor, a draft member adapted for connection with a trailer, said members being relatively movable along the line of draft, a helical spring, lost motion connecting means at one end of said spring engageable to couple the latter to said tractor draft member when the latter is moved forwardly relative to said trailer draft member, a trailer brake actuating member, lost motion connecting means engageable to couple said one end of said spring to said brake actuating member when said tractor draft member is moved rearwardly relative to said trailer draft member, lost motion connecting means engageable to couple the opposite end of said spring selectively to said trailer draft member or to said tractor draft member, responsive to movements of said tractor draft member forwardly or rearwardly relative to said trailer draft member, respectively, and detent means for locking said draft members, restraining movement of said tractor draft member rearwardly relative to said trailer draft member, said detent means being releasable responsive to a certain amount of force acting rearwardly against said tractor draft member.

23. A trailer hitch device comprising in combination, a pair of telescoping tractor and trailer members slidable relative to each other along the line of draft, a tension spring for transmitting draft between said members, means for connecting said trailer member to a trailer providing for limited movement relative thereto along the line of draft, lost motion connections associated with said trailer member adapted to engage one end of said spring when said trailer member is moved in one direction and the other end of said spring when said trailer member is moved in the opposite direction, lost motion connections associated with said tractor member adapted to engage opposite ends of said spring when said tractor member is moved in opposite directions, respectively, along the line of draft, and a trailer brake actuating member connected to said trailer member having a part mounted on the trailer and movable relative thereto to set brakes on the trailer when said trailer member moves relative to the trailer.

24. A device as set forth in claim 23 including a spring-biased detent for locking said tractor and trailer members against telescoping movement together but releasable upon application of a certain amount of force acting in compression against said members.

MILES H. TUFT.